United States Patent Office 3,376,334
Patented Apr. 2, 1968

3,376,334
CARBONIC ACID ESTERS OF
PANTOTHENIC ACID
Kanjiro Kobayashi, Hishinomiya, and Mitsuo Matsumoto, Chofu, Japan, assignors to Nikko Chemical Kabushiki Kaisha, Chuo-ku, Tokyo, Japan, a corporation of Japan
No Drawing. Filed June 17, 1965, Ser. No. 464,827
Claims priority, application Japan, July 1, 1964, 39/36,964
1 Claim. (Cl. 260—463)

ABSTRACT OF THE DISCLOSURE

The compound is in the class of carbonic acid esters of pantothenic acid, is useful as a cosmetic aid and is an α,γ-dicarboalkoxy-pantothenic acid ester represented by the general formula

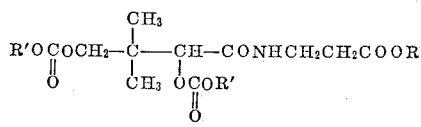

wherein R is a methyl or ethyl radical and R' is a methyl, ethyl, propyl or isopropyl radical.

---

This invention relates to α,γ-dicarboalkoxy-pantothenic acid esters.

It has been well known that pantothenic acid and pantothenic acid active substances are one of the nutrition factors important to dermal tissues in which a metabolic process is taking place, and is closely related specifically with the growth of hair. It has been also recognized that the main effective component of royal jelly which has recently come into common use as a nutrient or a beauty drug is pantothenic acid.

Generally, in order that any substance effective for improving the beauty of skin and hair growth may be formulated in cosmetics and may achieve its beneficial effect, it is most important that said substance should be stable and should be easily formulated into cosmetic preparations in such a fashion that it can be percutaneously absorbed. Concerning the percutaneous absorbability, generally a substance high in lipoid solubility is of high absorbability and a substance having a low melting point or a liquid substance is of higher absorbability than a substance having a high melting point.

Among the conventionally used pantothenic acid and pantothenic acid active substances are pantothenic acid alkali metal salts and alkaline earth metal salts and pantothenyl alcohols. However, these substances are very soluble in water, hardly soluble in lipoids, and insoluble in higher fatty acids, higher fatty alcohols, higher fatty acid esters, vegetable oils, etc. which are ingredients commonly used in cosmetics. They are also likely to be hydrolyzed in the presence of water and to lose activity. Therefore, they are not satisfactory for use as physiologically active ingredients of cosmetics.

Some lipo-soluble pantothenic acid active substances have been reported in the literature. For example, there have been disclosed pantothenic acid menthyl esters in U.S. Patent 2,979,525 (Apr. 11, 1961) and long-chain fatty acid esters of pantothenic acid or pantothenyl alcohol by T. Sakuragi & F. A. Kummerow in the Journal of the American Chemical Society, 78, 838 (1956). Further, in U.S. Patent 2,557,284 (June 19, 1951), α-acyl-pantothenic acid esters have been reported and, although no concrete example is described in its specification, α,γ-diacyl pantothenic acid esters have been suggested. However, the pantothenic acid menthyl esters have the defect that, when they are used in cosmetics, after the cosmetic has stood for a long period, the esters may decompose to emanate a menthol odor and change the odor of the perfume incorporated into the cosmetic. The long-chain fatty acid esters of pantothenic acid and pantothenyl alcohol have the defects that they are difficult to separate and purify from long-chain fatty acids by-produced from nonreactive long-chain fatty acid chlorides during the synthesis thereof and they are poor in solubility in common organic solvents, fats and oils. Referring to the above mentioned α,γ-diacyl pantothenic acid esters, only a rather complicated synthesizing process is described and no concrete example is described at all. Therefore, even in the literature, there are not described effective pantothenic acid active substances which are easy to synthesize and which can satisfy the above mentioned requirements for use as active ingredients in cosmetics.

We have discovered that α,γ-dicarboalkoxy-pantothenic acid esters represented by the formula

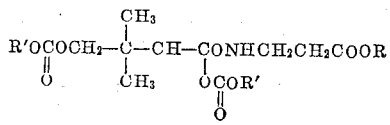

wherein R is a methyl or ethyl radical and R' is a methyl, ethyl, propyl or isopropyl radical are pantothenic acid active substances which satisfy the requirements mentioned above.

The α,γ-dicarboalkoxy-pantothenic acid esters of the present invention can be easily obtained at a high yield by making an alkyl chlorocarbonate react with methyl or ethyl pantothenate in the presence of an acid-binding-agent, such as pyridine. In such case, we have discovered that the products can be easily purified simply by washing them with acid and alkali aqueous solutions, although the products are not crystalline.

Further, we have discovered that when compounded in a cosmetic, the α,γ-dicarboalkoxy-pantothenic acid esters of the present invention undergo little hydrolysis, are stable and are insoluble in water. However, they are very soluble in many kinds of organic solvents and they have high compatibility with cosmetic materials. Moreover their lipo-solubility and liquid state make them suitable for percutaneous absorption.

It has been surprisingly discovered that the α,γ-dicarboalkoxy-pantothenic acid esters of the present invention are translucent viscous liquids and they are very sticky. They have the specific property of setting hair and when they are incorporated in a toilet preparation for hair, they show a superior hair-setting effect.

Further, the α,γ-dicarboalkoxy-pantothenic acid esters of the present invention are nontoxic. For example, an α,γ-dicarboethoxy pantothenic acid ethyl ester has a $LD_{50}$ value, per os, of 13.5 g./kg. in rats.

It has also been made clear that the α,γ-dicarboethoxy pantothenic acid esters are hydrolyzed in a living body and show a pantothenic acid activity because said esters, incorporated into a synthetic pantothenic acid-deficient diet [P. H. Phillips & E. B. Hart; Journal of Biological Chemistry, 109,657 (1935)], support the normal growth of young rats.

Creams, emulsions, lotions, tonics and sticks containing 0.2 to 2% of the α,γ-dicarboalkoxy-pantothenic acid esters of the present invention are effective for improving the health and beauty of skin, lips and hair. Specifically, the hair setting effect of a hair tonic, containing said esters, caused by the stickiness of the esters absorbed in hair after the ethanol or the like used in the tonic has evaporated, is one of the new effects of the present invention.

Thus the present invention provides lipo-soluble pantothenic acid derivatives which are suitable for use as additives to cosmetics and which are easy to synthesize.

The methyl or ethyl pantothenate which is a raw material in the present invention may be either D form or D,L-form and it can be easily synthesized from pantolactone and methyl or ethyl β-alaninate by a known process. Or, as described in Example 1, a process can be used in which a pantothenic acid salt, such as calcium pantothenate, which is a cheap commercial product today, is used as a raw material. It is made into a mixed pantothenic acid anhydride by reaction with alkyl chlorocarbonate, and said anhydride is then converted to the methyl or ethyl pantothenate. The process is valuable in obtaining methyl or ethyl pantothenate.

In carrying out the present invention, 1 mol of methyl or ethyl pantothenate was dissolved or dispersed in a mixture of an anhydrous inert organic solvent in a volume 5 to 10 times as large as the volume of the pantothenate and 2.5 to 5 mols of pyridine and 2.2 to 2.5 mols of an alkyl chlorocarbonate were gradually dropped into the above solution while the solution was being stirred and the temperature thereof was maintained at 0 to 10° C. The reaction mixture was then left to stand at room temperature overnight to complete the reaction. The product obtained was insoluble in water and nonreactive substances. The by-products were soluble in water, acid and alkali aqueous solutions and the products could be purified by washing with such solutions.

The α,γ-dicarboalkoxy-pantothenic acid esters obtained by the above mentioned process of the present invention were viscous oily liquids, but were so easily purified by washing that they were high in purity, and they gave only one spot in a thin layer chromatography. The products which were evaporated through a film evaporator to remove a slight amount of organic solvent showed a purity of more than 95% by the assay of pantolactone after alkaline hydrolysis. C. R. Szalhowski & J. H. Davidson, Jr.; Analytical Chemistry, 25, 1192 (1953).

The present invention shall be further explained with reference to the following examples:

Example 1

15 g. of calcium D-pantothenate were suspended in 75 g. of anhydrous dimethyl formamide. 7.5 g. of ethyl chlorocarbonate were dropped into the suspension over a period of about 15 minutes while the suspension was kept at 0 to −5° C. and was being stirred. When the stirring was continued for 30 minutes at the same temperature, a colorless clear solution of pantothenic acid ethoxy carbonate was obtained. 6 g. of absolute ethyl alcohol and 1 g. of triethylamine were added thereto and the solution was left to stand for 1.5 hours, at 20–25° C., to complete the esterification. When about ⅓ of the volume of the solution was distilled off under a vacuum to remove the triethylamine and ethyl alcohol, a clear colorless solution containing crude ethyl D-pantothenate was obtained. 15 g. of anhydrous pyridine were added to the solution. 17 g. of ethyl chlorocarbonate were dropped into the solution over a period of 20 minutes while the solution was kept at 0 to 5° C. and was being stirred. The solution was then left to stand at room temperature overnight. The solvent was evaporated out of the thus obtained slightly yellowish clear solution under a vacuum, 50 cc. of a solution of 0.5 to 1% hydrochloric acid were added to the residue. The deposited oily product was extracted with ethyl acetate. The extract solution was washed with a 5% aqueous solution of sodium sulfate and a 5% aqueous solution of sodium carbonate and then again with a 5% aqueous solution of sodium sulfate. After being dried over sodium sulfate ethyl acetate, the solution was evaporated as much as possible under a vacuum. Lastly, when the viscous liquid thus obtained was passed through a film evaporator to remove the residual solvent, there was obtained 17 g. of ethyl D-α,γ-dicarboethoxy-pantothenate as a slightly yellowish clear viscous liquid. It showed $n_D^{25}$ 1.4740, $[\alpha]_D^{25}$ +11.51° (c.=20% in ethyl alcohol), Rf 0.81 thin layer chromatography on silica gel elution with a butanol layer of n-butanol-acetic acid-water (4:1:5) and IR max 1740 cm.$^{-1}$ (—CO—O—) and 1660 cm.$^{-1}$ (—CO—NH) (film). After alkaline hydrolysis of this product, a purity of 97.5% was shown by the assay of pantolactone.

Example 2

12.7 g. of methyl β-alaninate hydrochloride were dissolved in 100 cc. of absolute methyl alcohol. A sodium methoxide solution produced from 2.3 g. of sodium metal and 100 cc. of absolute methyl alcohol were added to the solution. 13 g. of DL-pantolactone were then added thereto. The reaction mixture was left to stand for 12 hours. When the deposited sodium chloride was then removed by filtration and the methyl alcohol was then completely removed by distillation under a vacuum, methyl DL-pantothenate was obtained as a viscous oily residue. 100 ml. of anhydrous acetone and 35 g. of anhydrous pyridine were added thereto. 30 g. of isopropyl chlorocarbonate were dropped into the solution during a period of about 25 minutes while the solution was kept at 5° C. and was being stirred. The solution was left to stand at room temperature overnight. The solvent was then evaporated under a vacuum. The product was then treated and purified in the same manner as in Example 1 and 29 g. of slightly yellowish clear viscous liquid methyl DL-α,γ-dicarbo-isopropoxy-pantothenate were obtained. After alkaline hydrolysis of this product, a purity of 95.5% was shown by the assay of pantolactone.

What is claimed is:

1. An α,γ-dicarboalkoxy-pantothenic acid ester represented by the formula

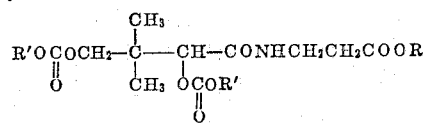

wherein R is a methyl or ethyl radical and R' is a methyl, ethyl, propyl or isopropyl radical.

References Cited
UNITED STATES PATENTS 3,124,608   3/1964   Schisla et al. _____ 260—463

CHARLES B. PARKER, *Primary Examiner.*

B. BILLIAN, L. C. MARUZO, *Assistant Examiners.*